United States Patent Office 3,642,719
Patented Feb. 15, 1972

3,642,719
PRODUCT AND PROCESS FOR THE PREPARATION OF ACRYLONITRILE AND X-METHYLENE GLUTARIC ACID ANHYDRIDE COPOLYMERS
Bernard C. Roest, Geleen, and Jozef L. M. van der Loos and Peter J. M. W. Claassen, Sittard, Netherlands, assignors to Stamicarbon N.V., Heerlen, Netherlands
No Drawing. Filed Dec. 30, 1969, Ser. No. 889,342
Claims priority, application Netherlands, Dec. 31, 1968, 6818848
Int. Cl. C08f 15/02, 15/40, 27/14
U.S. Cl. 260—78.5 R                 13 Claims

ABSTRACT OF THE DISCLOSURE

Copolymer containing at least 35 weight percent of acrylonitrile and the cyclic anhydride of α-methylene glutaric acid, preferably ranging from 0.1 to 10 weight percent, said copolymer having an intrinsic viscosity between 0.1 and 20; and process for preparing same.

The invention relates to copolymers of acrylonitrile and the anhydride of α-methylene glutaric acid and to the polymerisation of these monomers. Heretofore copolymers of acrylonitrile, which have generally been produced in the form of filaments, usually contain at least one comonomer for modifying the physical and mechanical properties of the polymer, and at least one comonomer to improve the dyeability characteristics thereof. A number of comonomers with acid or basic groups have been suggested in the literature for use as comonomers with acrylonitrile in order to produce a copolymer exhibiting improved dyeability characteristics.

It has now been found that the cyclic anhydride of α-methylene glutaric acid can be employed as a comonomer for improving the dyeability properties of the resulting copolymer. Under the usual conditions existing in the dye bath, the cyclic anhydride incorporated in the copolymer being dyed is hydrolysed to a dicarboxylic acid, which, in turn, reacts with the desired dye. In addition to improving the dyeability characteristics of the copolymer, the incorporation of cyclic anhydride into the copolymer permits compounds, such as acids, e.g. carboxylic acids, bases, primary or secondary amines, alcohols or water, to react with the copolymer.

The process for the preparation of the copolymers comprises polymerizing acrylonitrile and at least one comonomer comprising the cyclic anhydride of α-methylene glutaric acid, the amount of acrylonitrile being such that the resulting copolymer contains at least 35 weight percent acrylonitrile.

The introduction of small amounts of the anhydride gives highly improved dyeability characteristics to the polymer and the resulting copolymer does not show a tendency to cross-link so that no gel particles are formed and the copolymer can dissolve completely and homogeneously. This advantageous feature is not secured, for instance, when α-methylene glutaric acid is employed as the comonomer, as it has been found that when the latter is used, the resulting copolymer shows some cross-linking characteristics.

In addition to the acrylonitrile and the dyeability-improving comonomer i.e. the cyclic anhydride of α-methylene glutaric acid, the polymerization medium can, if desired, contain other conventional comonomers such as unsaturated esters like methylacrylate, methyl-methacrylate or vinyl acetate, and vinylchloride, vinylidene chloride, methacrylonitrile or styrene or their mixtures in an amount ranging between 0.1 to 64.9 weight percent of said copolymer.

The polymerization reaction is usually carried out in the presence of a liquid dispersion agent. The monomer mixture can be polymerized for example in a solvent such as dimethyl formamide, dimethyl acetamide or dimethyl sulphoxide. Further, dispersion agents in which the copolymer formed does not dissolve can also be employed, for example, hydrocarbons such as pentane, isooctane, 2,2,4,4,6-pentamethyl heptane, cyclohexane, benzene or toluene, or substituted hydrocarbons such as nitromethane, nitrobenzene or chlorobenzene. Also, if desired, water or aqueous salt solutions, such as aqueous solutions of zinc chloride or lithium chloride, can be used as the dispersion agent. Under these conditions the process can ultimately yield copolymers with α-methylene glutaric acid formed by hydrolysis of the cyclic anhydride. Further, if desired, the polymerization can be carried out in such an amount of acrylonitrile will act as the dispersion agent. An extraneous dispersion agent in this case is not necessarily required. The liquid dispersion agent can also contain conventional additives, such as soaps, e.g. sodium lauryl sulphate.

The polymerization, conveniently, is carried out in the pressure of a free radical generator, such as azoisobutyronitrile, lauroyl peroxide, di(tertiary butyl - 4 - cyclohexyl) percarbonate or cumene hydroperoxide or, if desired, redox catalysts such as hydrogen peroxide or potassium persulphate with sodium metabisulphite and, if desired, with ferrous compounds such as ammonium sulfate or ferrous sulfate. The polymerization can also be initiated by radiation, e.g. by UV radiation. Obviously, other conventional polymerization initiators can be employed.

The temperature at which the polymerization is carried out can be varied within wide limits, e.g. between —85° C. and 150° C. but preferably between 10 and 90° C. The pressure is not critical; normally a pressure above atmospheric pressure is employed, for instance a pressure of 1 to 50 atm., although a pressure ranging from subatmospheric, say about 0.1 atm. (absolute) to a superatmospheric pressure, say about 200 atm. or higher can be used. If it is desired to employ a relatively high pressure, nitrogen can be introduced into the polymerization medium. Normally, the process is carried out under oxygen-free conditions. Depending on the polymerization technique used, the polymerization time varies from a few minutes to several hours i.e. from about 2 minutes to 50 hours. The polymerization can also be carried out in one or several stages.

The concentration of the finished polymer in the polymerization medium can depend on the choice of dispersion agent employed. For instance, when the dispersion agent is a solvent for the resulting copolymer the concentration can be fairly high, e.g. up to 40% by weight while the concentration of the polymer when an aqueous medium is employed lies at a lower level, e.g. at 15% by weight or lower.

The polymers prepared according to the invention comprise at least 35% by weight, preferably at least 85% by weight, of acrylonitrile, and about 0.1–10% by weight, preferably 0.5–6% by weight of the cyclic anhydride of α-methylene glutaric acid as the dyeability improving monomer. When other comonomers are employed, they will generally be present in amounts ranging from about 0.1 to 64.9 percent based on the weight of the copolymer.

The molecular weight of the copolymers is indicated by means of the intrinsic viscosity determined in a 0.1% by weight solution of the polymer in dimethylformamide at 20° C. The intrinsic viscosity usually lies between 0.1 and 20 (dl./g.), more preferably between 0.2 and 10 (dl./g.).

The polymers obtained according to the invention can be processed by any suitable method, e.g. by injection molding, pressure molding, or extrusion. More specifically, the polymer will be processed to filaments, e.g. by spinning of a melt or a polymer solution. Other shaping techniques may also be used. The polymers may be mixed with the customary additives such as heat stabilizers, UV-stabilizers, pigments, dyes, plasticizers, fillers, lubricants and the like.

EXAMPLE 1

300 cm.$^3$ of distilled, oxygen-free water is brought into a polymerization reactor under oxygen-free conditions. The water is adjusted to a pH of approximately 2.5 by addition of dilute sulphuric acid, whereupon it is heated up to the polymerization temperature of 55° C. Next, 1.2 g. of sodium laurylsulphate, 2.1 mg. of Mohr's salt, 0.3 g. of potassium persulphate, 0.1 g. of sodium metabisulphite and finally 15 g. of distilled acrylonitrile and 0.15 g. of the anhydride of α-methylene glutaric acid are added in succession. The polymerization is allowed to continue for 30 minutes, with simultaneous stirring.

Upon removal, washing and drying of the polymer, 12.5 g. of the polymer with an intrinsic viscosity of 0.8 dl./g. are obtained.

To evaluate the dyeability, the polymer is dissolved in dimethyl formamide and processed to a film. The resulting film is treated for 15 minutes with a ½% by weight solution of a basic dye ("Astradiamant Grün GX"; C.I. 42040) in water. The dyed film is washed in a boiling solution of the synthetic detergent sodium laurylsulfate and subsequently rinsed in cold water for ½ hour. The film treated in this way is deep-green in colour. A similar experiment, carried out without the incorporation into the copolymer of the cyclic anhydride of α-methylene glutaric acid, yielded a poorly dyed film.

EXAMPLE 2

200 ml. of distilled, oxygen-free 2,2,4,4,6-pentamethyl heptane is brought into a polymerization reactor under oxygen-free conditions. After that, 19.8 g. of acrylonitrile, 0.2 g. of the anhydride of α-methylene glutaric acid and 0.2 g. of lauroyl peroxide are added in succession. The polymerization, carried out at 80° C. over a period of 4 hours, gives a yield of 15 g. of copolymer. The intrinsic viscosity is 4.1 dl./g. A film made of this material is readily dyed.

EXAMPLE 3

Example 2 is repeated with the use of a monomer mixture consisting of 19 g. of acrylonitrile and 1 g. of the anhydride of α-methylene glutaric acid. 18 g. of copolymer with an intrinsic viscosity of 1.75 dl./g. is obtained. A film, as well as a fibre, of this material is very readily dyed.

EXAMPLE 4

Example 2 is repeated with a monomer mixture consisting of 19.98 g. of acrylonitrile and 0.02 g. of the anhydride of α-methylene glutaric acid. 17 g. of polymer with an intrinsic viscosity of 4.25 dl./g. is obtained. The film made of this product exhibits favorable dyeability characteristics.

EXAMPLE 5

Example 2 is repeated, with the difference that use is made of 0.4 g. of lauroyl peroxide and a monomer mixture consisting of 18 g. of acrylonitrile, 1.8 g. of methylacrylate and 0.2 g. of α-methylene glutaric acid anhydride. 16.7 g. of copolymer with an inherent viscosity of 1.93 dl./g. are obtained. Film and fibres prepared from the product copolymers are readily dyed.

EXAMPLE 6

1000 ml. of distilled oxygen-free heptane are introduced into a polymerization reactor and 30 g. of acrylonitrile, 1 g. of α-methylene glutaric acid anhydride, 69 g. of vinylidene chloride and 1 g. of lauroyl peroxide are then added in succession. The polymerization is carried out in 45 minutes at 45° C., under a pressure of about 1.5 atm. 52.5 g. of copolymer consisting to 40% by weight of acrylonitrile, 59.5% by weight of vinylidene chloride and 0.5% by weight of α-methylene glutaric acid anhydride are obtained. The inherent viscosity of the polymer is 1.92 dl./g. Film and fibres made of the copolymer product are readily dyed.

EXAMPLE 7

A copolymer with an intrinsic viscosity of 1.8 dl./g. and consisting of 95% by weight of acrylonitrile and 5% by weight of the anhydride of α-methylene glutaric acid is hydrolysed at 100° C. and within a period of 10 minutes in an excess of water with a pH of 2.5. The intrinsic viscosity remains unchanged; however, the anhydride groups are converted to dicarboxylic acid groups by this treatment.

Copolymers of acrylonitrile and the cyclic anhydride of α-methylene glutaric acid together with one or more of the following comonomers, methylmethacrylate, vinyl acetate, vinyl chloride, vinylidene chloride, methacrylonitrile and styrene are also prepared and exhibit comparably favorable dyeability characteristics.

What is claimed is:

1. A copolymer of acrylonitrile and the cyclic anhydride of α-methylene glutaric acid, the acrylonitrile comprising at least 35 weight percent of said copolymer and said copolymer having an intrinsic viscosity ranging between 0.1 and 20 dl./g. as determined in a 0.1% by weight solution of said copolymer in dimethyl formamide at 20° C.

2. The copolymer of claim 1 wherein the copolymer contains 0.1–10 weight percent cyclic anhydride of α-methylene glutaric acid.

3. The copolymer of claim 1 wherein the copolymer contains at least 85 weight percent acrylonitrile.

4. The polymer of claim 1 which includes a comonomer of methylacrylate, methylmethacrylate, vinyl acetate, vinyl chloride, vinylidene chloride, methacrylonitrile or styrene in an amount ranging between 0.1 to 64.9 weight percent of said copolymer.

5. The copolymer of claim 1 in the hydrolyzed form.

6. A process for improving the dyeability of an acrylonitrile polymer comprising polymerizing acrylonitrile with the cyclic anhydride of α-methylene glutaric acid, the acrylonitrile being present in amounts sufficient so that the resulting copolymer contains at least 35 weight percent acrylonitrile.

7. The process of claim 6 wherein the cyclic anhydride of α-methylene glutaric acid is used in amounts sufficient so that the resulting copolymer contains from 0.1–10 weight percent of said anhydride.

8. The process of claim 6 which includes polymerizing acrylonitrile and the cyclic anhydride of α-methylene glutaric acid with a member selected from the group consisting of methylacrylate, methylmethacrylate, vinyl acetate, vinyl chloride, vinylidene chloride, methacrylonitrile or styrene, said member being present in amounts sufficient so that the resulting copolymer contains 0.1 to 64.9 weight percent of said member based on the weight of said copolymer.

9. The process of claim 6 wherein the polymerization is carried out at a temperature between −85° C. and 150° C. under oxygen free conditions and in the presence of a free radical generator.

10. The process of claim 9 wherein the temperature ranges between 10–90° C.

11. The process of claim 6 which includes dispersing said acrylonitrile and said cyclic anhydride of α-methylene glutaric acid in a dispersing agent prior to polymerization.

12. The process of claim 11 wherein the dispersing agent is a solvent for the resulting copolymer.

13. The process of claim 11 wherein the dispersing agent is a non-solvent for the resulting copolymer.

References Cited

UNITED STATES PATENTS 2,734,888   2/1956   D'Alelio _____ 260—45.8

JOSEPH L. SCHOFER, Primary Examiner

J. KIGHT III, Assistant Examiner